Patented Feb. 18, 1930

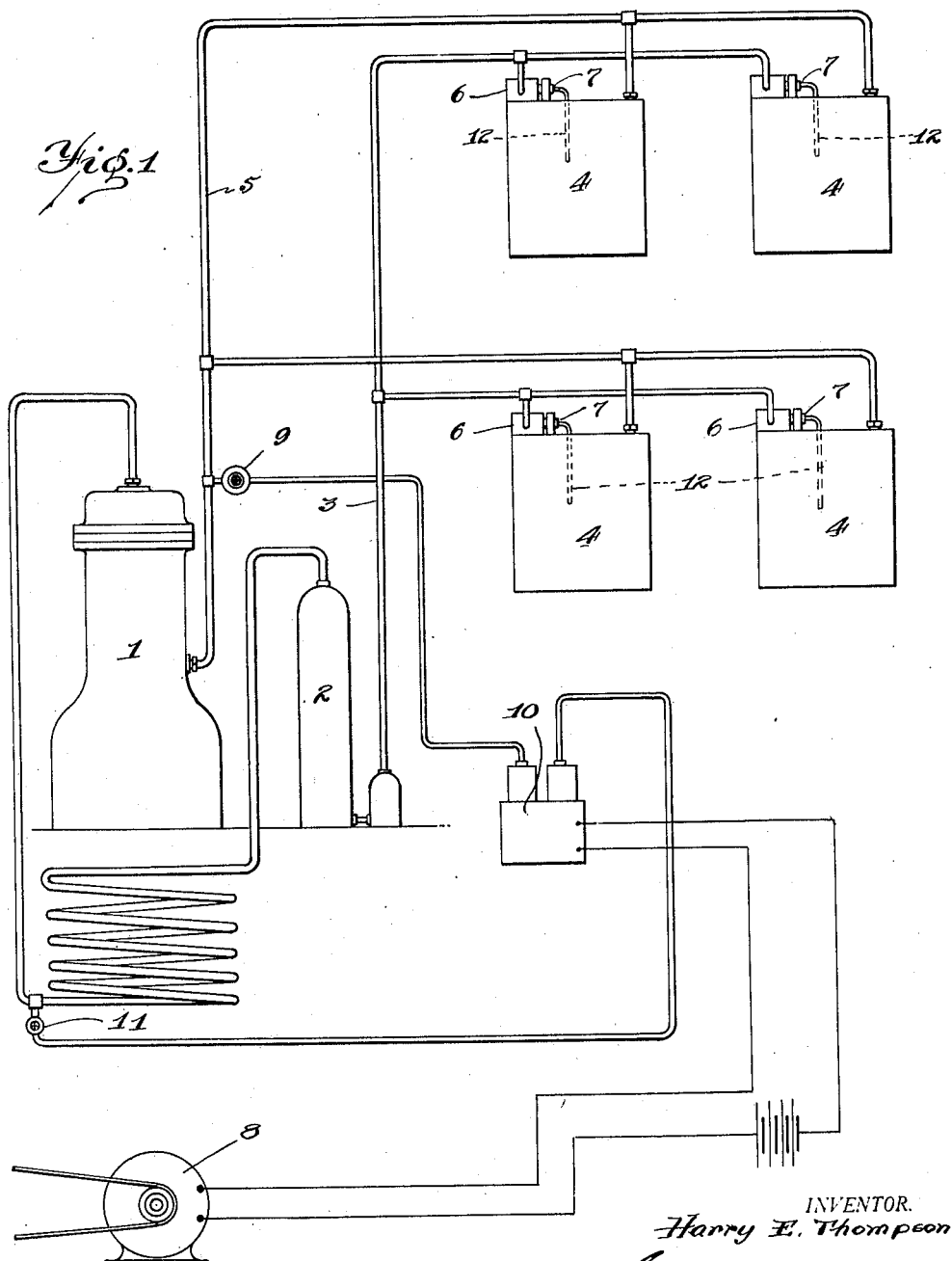

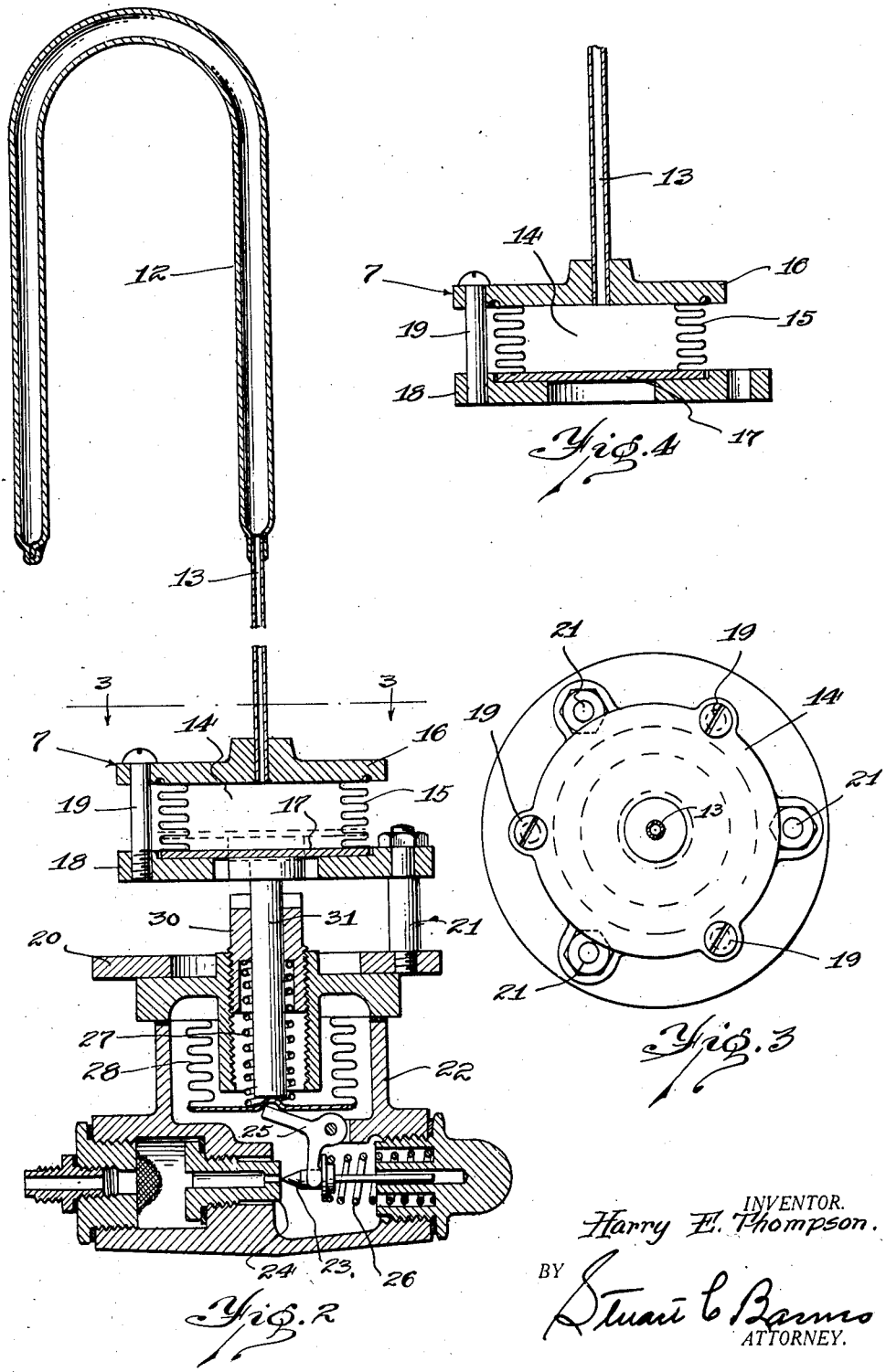

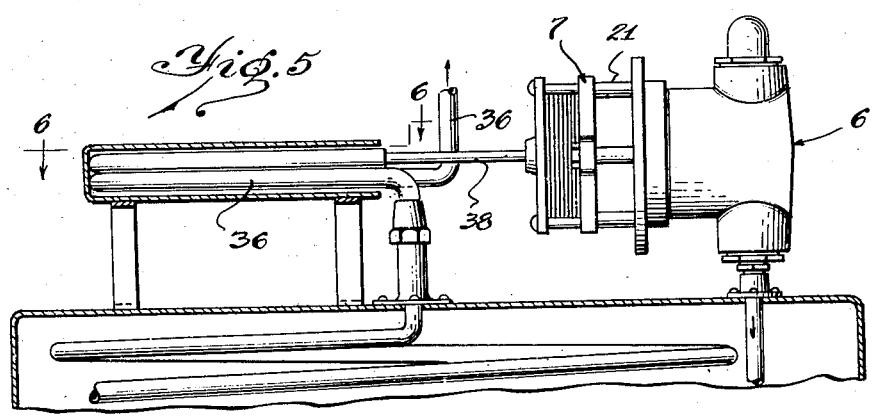
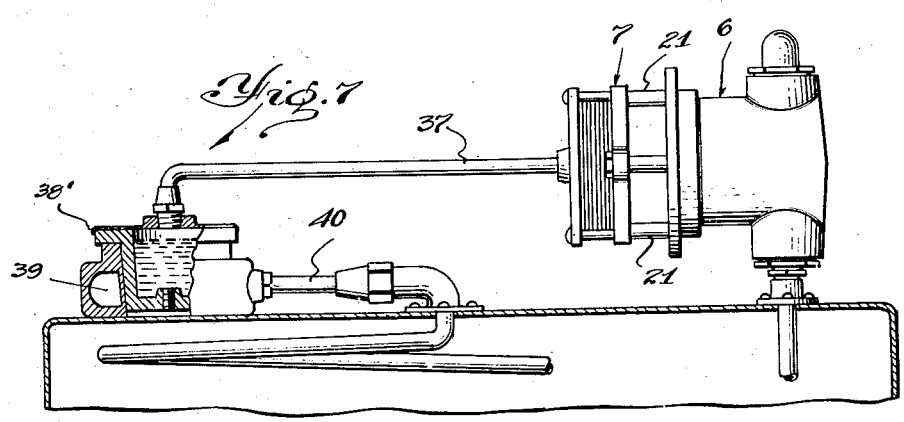
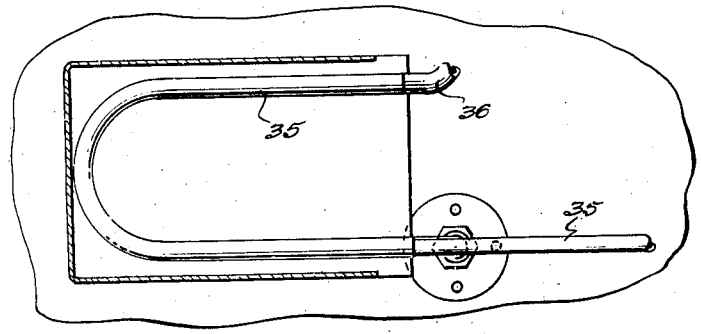

1,747,958

UNITED STATES PATENT OFFICE

HARRY E. THOMPSON, OF DETROIT, MICHIGAN, ASSIGNOR TO UNIVERSAL COOLER CORPORATION, OF DETROIT, MICHIGAN, A CORPORATION OF MICHIGAN

THERMOSTATIC CONTROL FOR AUTOMATIC REFRIGERATING SYSTEMS

Application filed August 24, 1927. Serial No. 215,091.

This invention relates to thermostatic controls for automatic refrigerating systems and has to do particularly with refrigerating systems of the direct expansion type having a plurality of cooling units connected to a common refrigerating apparatus. It will be understood, however, that the invention may be equally well embodied in refrigerating systems having a single cooling unit and a single refrigerating apparatus.

In refrigerating systems utilizing a "dry" system, and where a plurality of cooling units are connected to a single refrigerating apparatus, considerable difficulty has been experienced in attempting to provide a suitable control for the separate cooling units, whereby each cooling unit will receive its proportional amount of refrigerant without in any way affecting the supply of refrigerant to any other cooling unit. Various thermostatic control devices have been designed in attempts to provide an efficient independent control for each cooling unit, but so far as I am aware such controls have been inefficient in that they at times allow substantially all the refrigerant to be absorbed by independent cooling units, or present various mechanical and design problems as to cleaning, repairing, and replacing, which detracts considerably from the efficiency of the system.

It is the object of the present invention to directly control the supply of the refrigerant to each separate cooling unit by the expansion valve of such unit. In other words, the expansion valve is directly controlled to in turn control the flow of refrigerant to the cooling unit according to the temperature around such cooling unit. Where a plurality of cooling units are supplied by a single or plurality of refrigerating apparatus, the flow of refrigerant to each separate cooling unit is directly controlled by the expansion valve and the temperature around and/or in the cooling unit, and the operation of the refrigerating apparatus is independently controlled by a suitable pressure thermostat connected in the system.

The thermostatic control utilized in connection with the expansion valve constitutes an important feature of this invention in that it is so positioned as to be instantly responsive to a given change in temperature adjacent, and/or in the cooling unit, and which may be readily attached to the expansion valve and very quickly removed for cleaning, repairing, or exchange, without in any way affecting the other parts of the system or expansion valve. The result of this is that in order to remove or repair this novel thermostat it is not necessary to disassemble any valve in the system or to drain the refrigerant or to disassemble or adjust any of the parts, the thermostat control unit being independently removable as a complete unit.

In the drawings:

Fig. 1 is a diagrammatical elevation of a multiple unit refrigerating system embodying my novel control apparatus.

Fig. 2 is a vertical sectional detail view of my novel thermostatic control device and showing one form of feeler leg.

Fig. 3 is a section taken on line 3—3 of Fig. 2.

Fig. 4 is a vertical section taken through the thermostat element.

Fig. 5 is a fragmentary elevation, partly in section, of a modified form of my thermostatic control device.

Fig. 6 is a plan view of the structure shown in Fig. 5.

Fig. 7 illustrates a further modified form of my device in that the feeler leg terminates in a non-expansible casting surrounded by the expanded refrigerant.

While my novel thermostatic control is applicable to single units its most important application is to refrigerating systems having multiple cooling units and in Fig. 1 I have illustrated diagrammatically such a type of system. In this figure the compressor unit may be designated 1, the receiver for the compressor 2, and the general supply line for the refrigerant 3. The cooling units which may be designated 4 may be suitably positioned in any part of the building as desired, the refrigerant being conducted thereto by conduits leading from the supply line 3 and the expanded refrigerant conducted away therefrom by conduits leading to the pipe 5. Suitable expansion valves 6 control the expansion of the refrigerant as it passes to the cooling units or brine tanks 4, and the flow of refrigerant through the expansion valves 6 is directly controlled by a suitable thermostatic element which may be generally designated 7. The refrigerant supply to each individual cooling unit is therefore directly controlled by the temperature adjacent or in such particular unit. The operation of the motor which is diagrammatically illustrated at 8 is controlled by a suitable pressure control 9 connected to the return system, whereby the varying pressure in the control element 9 will open or close the switch 10 to stop or start the motor and compressor. If desired a suitable pressure control element 11 may be installed in the high side of the system to insure stopping of the motor in case the pressure became too high.

The thermostatic control for controlling the flow of refrigerant through the expansion valve is illustrated in detail in Fig. 2, and consists of a feeler leg which may be designated 12 which is adapted to contain any suitable expansible fluid and is in turn connected through a suitable tube 13, to an expansible chamber 14. This chamber 14 preferably consists of a suitable bellows 15 confined between a suitable head 16 and a movable plate 17 which latter is limited in its movement by a head 18 which is clamped to but spaced from the head 16 by suitable bolts 19. The head 18 is detachably secured to a plate 20 for forming a part of the expansion valve, by means of suitable bolts 21.

The expansion device which I have shown in illustrating the embodiment of my invention is of standard construction, in that it comprises a suitable housing 22 having a reciprocable valve 23 adapted to seat against a suitable valve seat 24. The valve 23 is controlled by a suitable bell crank 25, the valve being backed by a suitable spring 26 and the one arm of the bell crank operating against the resiliency of a spring 27. A suitable bellows 28 is provided to permit movement of the valve actuating lever 25.

The spring 27 may be adjusted in tension by means of a suitable member 30 but in the application of the present invention instead of having a mere adjusting member for this expansion valve I provide the member 30 with a suitable plunger 31 adapted to contact with the bottom of the bellows 28 and in turn to actuate the bell crank lever 25. The top of the plunger 31 is adapted to contact with the plate 17 which forms the bottom of the bellows 15. It will thus be obvious that any variation in temperature adjacent the feeler leg 12 will directly affect the fluid contained therein, whereby to expand or contract the bellows 15 and directly actuate the lever 25 and valve 23. It will be obvious that the entire thermostatic unit 7 may be completely removed by merely disconnecting the bolts 21 whereby such unit may be lifted from its position without in any way whatsoever affecting the expansion valve assembly or the refrigerant in the system. The feeler leg may be repaired, the fluid may be replaced, any repairs may be made or the entire unit may be replaced without disturbing or materially affecting the refrigerating system. The refrigerant flow to each cooling unit will be directly and positively controlled independently of the flow to any other unit whereby each refrigerating unit will be maintained at the proper temperature as long as the refrigerant supply is maintained by the main refrigerating apparatus. The pressure control element 9 will control the operation of the compressor according to the pressure of the system and this will completely eliminate all wires in the refrigerator box which have heretofore been necessary where the control switch has been located in the cooling chamber of the refrigerator. Whether the refrigerating apparatus consists of a single unit or a multiple unit system the wiring is made comparatively simple and very inexpensive by the present device.

In Fig. 4 I have shown in detail the preferred arrangement of the bellows and the manner of connecting the same. It will be understood that any suitable expansible means may be utilized so long as the thermostatic control unit can be completely and quickly removed independently of the expansion valve.

In Fig. 5 I have illustrated a modified application of my novel thermostatic control device. In this modification the thermostat 6 with the bellows structure may remain the same, but the feeler leg, which may be designated 35, is in the form of a loop or horseshoe as clearly shown in Fig. 6 and is positioned in direct physical contact with a pipe 36 leading from the expansion coil to the compressor. I find that this is a most efficient way of subjecting the feeler leg of the thermostat to the influence of the refrigerant in the discharge pipe of the expansion coil as any change of the fluid in this conduit is quickly communicated through the thermostat and thus quickly controls the flow of refrigerant through the expansion valve.

The modification shown in Fig. 7 is somewhat similar to the structure shown in Fig. 5 with the exception that the feeler leg which may be designated 37, terminates in a casting 38' which is adapted to be positioned in another casting or conduit 39. The passageway of the conduit 39 is in direct communication with the coil 40 leading from the expansion coil with the result that the refrigerant is divided adjacent the casting 38 whereby the expansible fluid in the casting is subjected to a greater surface area of refrigerant as it is divided and passes through the passageway 39. In both the construction shown in Figs. 5 and 7 it will be seen that the thermostatic control unit 7 is quickly and readily detachable from the expansion valve without in any way necessitating disassembling or adjusting the parts.

What I claim is:

1. In a refrigerant control system, the combination of a common refrigerating apparatus for supplying a refrigerating medium, one or more cooling units for receiving the refrigerating medium, an expansion valve for each cooling unit for expanding and controlling the flow of refrigerant, separate pressure control means for controlling operation of the refrigerating apparatus, and a thermostatic control mounted independently of but in operative relation to each expansion valve to control the flow of refrigerant therethrough.

2. A refrigerant control device for refrigerating systems of the direct expansion type, comprising in combination, an expansion valve having a movable member for directly controlling the flow of refrigerant to the cooling member, a plunger mounted in the expansion valve independently of, but in operative relation with and for actuating the refrigerant control means thereof, and a thermostatic control unit comprising a non-expansible feeler member, and a fluid expansive member, said fluid expansive member being removable without loss of refrigerant and mounted independently of and spaced from the expansion valve, but being in operative contact with said plunger.

3. A refrigerant control device for refrigerating systems of the direct expansion type comprising in combination an expansion valve having a movable member for controlling the flow of refrigerant to the cooling unit, a plunger for actuating but mounted independently of and in operative relation with, said movable member, a sylphon for separating the plunger and movable member, and a thermostatic control unit comprising an expansible member mounted adjacent to but independently of the parts of the expansion valve, a portion of the expansible member being positioned in operative relation to said plunger, said thermostatic unit being removable without loss of refrigerant.

4. A refrigerating control device for refrigerating systems of direct expansion type comprising in combination a thermostatic unit, an expansive valve for controlling the flow of the refrigerant, a casing enclosing a plunger, spring, and sylphon, a plunger cooperating with a sylphon and a spring to operatively connect the expansive valve and the thermostatic unit, said sylphon forming an air-tight seal between expansive valve and the thermostatic unit and permitting removal of the thermostatic unit without interfering with the refrigerant.

In testimony whereof I affix my signature.

HARRY E. THOMPSON.